Jan. 2, 1940.  T. D. McHALE  2,185,512
STRAINER
Filed March 19, 1938
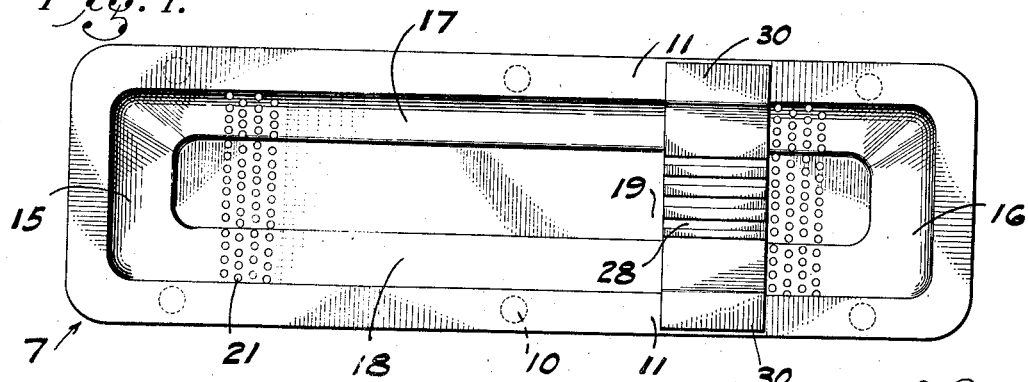
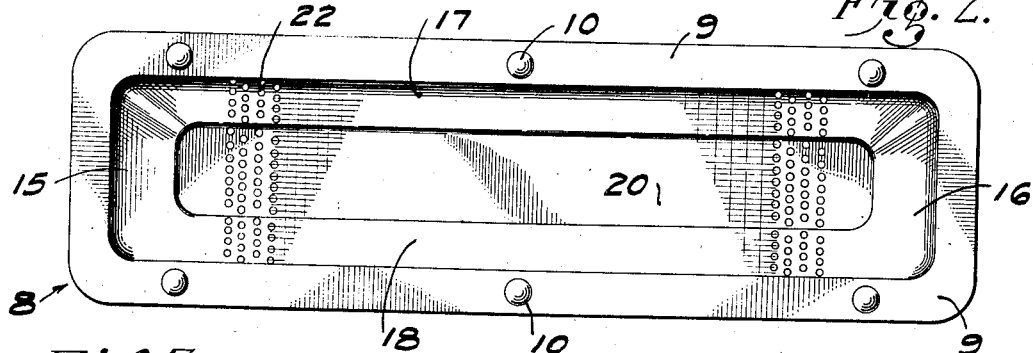
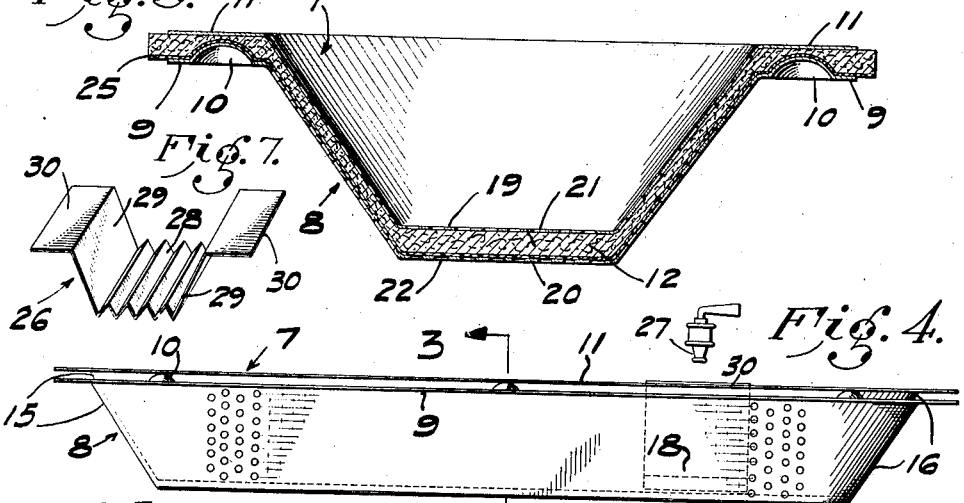
THOS. D. McHALE,
INVENTOR.
BY
ATTORNEY.

Patented Jan. 2, 1940

2,185,512

UNITED STATES PATENT OFFICE 2,185,512

STRAINER

Thomas D. McHale, Los Angeles, Calif.

Application March 19, 1938, Serial No. 196,926

4 Claims. (Cl. 210—158)

The present invention relates to improvements in straining devices and particularly to devices adapted to straining milk.

Important objects of the invention are to provide in a device of the above nature an improved article embracing a structure of a seamless and streamline character which is of a more sanitary nature, more easy to cleanse and to be kept clean, and more simple and less expensive to manufacture.

A further object of the invention is to provide in devices of this nature interfitting troughs each of which are of a like uniform standard size, formed from a single sheet and free from any laps, joints or welded seams wherein bacteria of an injurious nature may lodge and afterward make their way into the human body.

A still further object of the invention resides in the improved simplified means for more securely gripping the filter sheets between the assembled troughs and spacing the parts apart in such a manner that a registered position of the perforations in one strainer with the other is unnecessary.

Another important object is to provide a pair of strainer members which will interfit in such a manner that a sheet of filtering fabric may be smoothly fitted in between them without any portion thereof being creased or folded over upon itself, and also to make it possible to interpose the filtering sheet and any porous filtering layer which may accompany it, between end, side and bottom portions of the paired filtering members. Owing to this feature of the invention, and to other improved features thereof, all the milk is strained, there being no pockets or crevices wherein a residue of milk will be found after a straining operation has been completed.

Only one die, consisting of a male and female member, is required in the manufacture of the two parts of which the metallic portion of the strainer consists. The extreme simplicity of the device reduces cost of manufacture and also results in a lighter, more efficient strainer, easier to handle and more quick to assemble and to disassemble, the lightness and compactness of the device also lessening shipping costs.

Still another valuable feature of the invention resides in the provision of a pair of strainer members which are shiftable with relation to each other after a straining operation has been completed, in such a manner as to efficiently squeeze the residual milk out of the compressible filtering material which is interposed between them. Hence an economy is effected by saving milk that would otherwise be wasted.

In addition to the foregoing objects, it is an object of the invention to provide an improved anti-splash member which will efficiently perform not only the function of preventing any portion of an incoming stream of milk from splashing over the top of the strainer, but will also protect the layer of porous straining material from being damaged by the force of such a stream of milk. This feature of the invention also relates to an anti-splash member which constitutes a new article of manufacture which may be made and sold separately from the remaining portion of the device, to be used in other situations if desired.

Still other objects, improved features and indications of invention will hereinafter appear.

Referring to the accompanying sheet of drawings wherein is shown the device as now reduced to practice and being sold in the trade—

Fig. 1 is a plan view of the structure shown in Fig. 4.

Fig. 2 is a plan view of the bottom trough of the strainer shown in Fig. 4.

Fig. 3 is a transverse section taken on line 3—3 of Fig. 4. In Fig. 3 the filter sheet, which was purposely omitted from the view in Fig. 4 in order to disclose details which would otherwise be hidden from view, is shown and the means whereby the filter sheet is gripped and at the same time the devices are spaced in relation to each other is included in the view.

Fig. 4 is a side elevation of the two strainers in assembled relation without the showing of the usual filter sheet therebetween.

Fig. 5 is a plan view of the straining material or milk filter on a reduced scale.

Fig. 6 is a section taken on line 6—6 of Fig. 5.

Fig. 7 is a perspective view separately showing an anti-splash member which forms a part of the invention.

Referring in detail to the drawing, the metallic portion of the device comprises the upper and inner trough 7 and the lower and outer trough 8, these two trough members being, by preference, and as shown, of identical size and shape except that the marginal flange 9 of the lower trough 8 is furnished with spacing lugs 10 which are upstruck from the metal as shown. These spacers underlie and all abut against the marginal flange 11 of the upper trough 7 and thus hold said two troughs properly spaced apart to receive between them the layer of filtering material 12.

By preference and as shown the end walls 15 and 16 of the troughs are imperforate, but their side walls 17 and 18 and also their bottoms 19 and 20 are foraminated. The individual perforations 21 or 22, of each trough are preferably circular, all of the same size and spaced apart from each other a distance about equal to their diameter.

Owing to the use of the spacers 10 it does not matter whether or not the perforations of the upper trough aline with those of the lower trough when said two troughs are placed in the superposed relation shown in Fig. 4, but when a strainer of this type is constructed with only a very narrow space between the interfitting members and a single sheet of filtering fabric in such space, care must be taken to aline the upper and lower individual perforations or the flow of the liquid being strained will be too greatly impeded.

Any desirable or well known filtering or straining material may be used between the two superposed troughs for straining purposes, but I prefer to use a filtering material 12 shown in Figs. 5 and 6 preferably consisting of cotton batting and underlying it is shown a gauze cloth 25.

In the manufacture of the device the perforations of the foraminated areas may be formed either before the troughs have been otherwise acted upon by a die, or the perforations may be formed by a suitable die structure just before completion of pressing into the shapes shown in the drawing. It is desirable that the formation of said perforations be not left till all the shaping has been done, for if that should be the case some roughened surfaces might result. When, however, the shaping and perforating operations are properly performed a smooth streamline contour results in the completed article.

From Fig. 3 it will be seen that the assembled structure comprises a pair of elongated, trough-shaped, sheet metal members, which are of a truncated V-shape in cross-section, and each of which is furnished along the top of each of its sides with a longitudinal substantially horizontal flange, said members being identical as to size and shape except that the flange 9 of the lower member has in it a plurality of upstruck indentations 10 which underlie and contact with the flange 11 of the upper member and thereby support said upper member in a nested, upwardly spaced relation to its mate.

Owing to the fact that each of the two metallic strainer members has inclined walls both at its sides and at its ends, it is possible to put the straining fabric in place without wrinkling or creasing it. Also this feature, in conjunction with the fact that the spacing bosses 10 of the lower strainer member 8 are all of them outwardly spaced from the inner edge of the flange 9, permits shifting the inner strainer member 7 first in one direction and then in the opposite direction both longitudinally and transversely to squeeze the milk out of the side portions of the porous material after a straining operation. Also downward pressure upon the upper strainer member 7 will squeeze out a considerable portion of the milk between the bottom portions of the two strainer members.

The completed, cooperating sheet metal troughs are both free from seams and from rough portions which might result if soldering were employed.

In Fig. 7 is separately illustrated the anti-splash member 26, which is shown in place upon the strainer in Figs. 1 and 4, a spigot 27 being shown in the latter view in a position to deliver a stream of milk upon the angularly corrugated bottom portion 28 of said anti-splash member 26. Said member 26 has diverging, upwardly directed wings 29 each furnished with an outwardly directed flange 30, these flanges being adapted to rest upon the flange 10 of the upper strainer member 7, the dimensions of the wings 29 being such as to bring the bottom of the inserted member 26 up a little above the bottom of the strainer member 7. These wings may be utilized, if desired, to support the anti-splash member upon the sides of other vessels than that formed by the strainer troughs shown, and other liquids than milk may also be kept from splashing by the use of said anti-splash member. In using this anti-splash member on the strainer structure shown said member may be positioned at any desired point along the length of the strainer trough 7.

The bottom of the anti-splash member 26 is shown furnished with V-shaped corrugations but other means than the corrugations, having upwardly directed points, may be used to prevent splashing, without departing from the spirit of the claimed invention.

It should be understood that the present disclosure is for the purpose of illustration only and that this invention includes all modifications and equivalents which fall within the scope of the subject matter claimed.

What is claimed is:

1. A strainer consisting of a pair of elongated trough-shaped sheet metal members which are of a truncated V-shape in cross-section, and each of which is furnished along the top of each of its sides with a longitudinal, substantially horizontal flange, said members both being identical as to size and shape except that the aforesaid flanges of one of them has in it a plurality of upstruck indentations which underlie the flange of the other member and thereby support said other member of the pair in an upwardly spaced, nested relation to its mate, both of said members having foraminated portions in a spaced relation to each other, and a straining material occupying the space between said foraminated portions.

2. A strainer combination consisting of a pair of seamless, streamline, elongated trough-shaped single sheet metal members which are of a truncated V-shape both in longitudinal and transverse mid-section and each of which is furnished along the top of each of its sides with a longitudinal, substantially horizontal flange, said members both being identical as to size and shape except that the aforesaid flanges of one of them have in them a plurality of upstruck bosses which underlie the flanges of the other member and thereby support said other member of the pair in an upwardly spaced, longitudinally and transversely shiftably nested relation to its mate, both of said members having foraminated portions in a registrable spaced relation to each other, and a filter layer occupying the space between said foraminated portions, said filter layer comprising a cotton batting provided with a gauze backing on one face thereof and the latter face being placed downwardly in the nested relation of the combination.

3. The subject matter of claim 2 and, said filter layer being gripped between said pair by said bosses and being compressible to squeeze liquid out of it after a straining operation when one trough is shifted in relation to the other trough.

4. In a strainer structure, a pair of interfitted sheet metal strainer members having perforated bottoms which are in a slightly vertically spaced relation to each other, a layer of porous filtering material filling in the space thus provided, and an anti-splash member supported within said strainer structure and having a splash preventing bottom portion which is slightly spaced above the bottom of the innermost of said interfitted members.

THOS. D. McHALE.